United States Patent
Wang et al.

(10) Patent No.: US 11,893,977 B2
(45) Date of Patent: Feb. 6, 2024

(54) METHOD FOR RECOGNIZING CHINESE-ENGLISH MIXED SPEECH, ELECTRONIC DEVICE, AND STORAGE MEDIUM

(71) Applicant: BEIJING BAIDU NETCOM SCIENCE TECHNOLOGY CO., LTD., Beijing (CN)

(72) Inventors: Zhijian Wang, Beijing (CN); Sheng Qian, Beijing (CN); Qi Zhang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 259 days.

(21) Appl. No.: 17/530,276

(22) Filed: Nov. 18, 2021

(65) Prior Publication Data

US 2022/0139369 A1    May 5, 2022

(30) Foreign Application Priority Data

Dec. 1, 2020 (CN) .......................... 202011399785.6

(51) Int. Cl.
   *G10L 15/183* (2013.01)
   *G10L 15/00* (2013.01)
   *G10L 15/32* (2013.01)

(52) U.S. Cl.
   CPC .......... *G10L 15/005* (2013.01); *G10L 15/183* (2013.01); *G10L 15/32* (2013.01)

(58) Field of Classification Search
   CPC ..... G10L 15/005; G10L 15/00; G10L 15/183; G10L 15/32
   See application file for complete search history.

(56) References Cited

U.S. PATENT DOCUMENTS 10,042,845 B2   8/2018  Amin et al.
10,679,615 B2   6/2020  Chao et al.
(Continued)

FOREIGN PATENT DOCUMENTS

CN   101727901 A   6/2010
CN   101826325 A   9/2010
(Continued)

OTHER PUBLICATIONS

Chinese Notice of Allowance dated Aug. 11, 2021 as received in application 202011399785.6.
(Continued)

*Primary Examiner* — Huyen X Vo
(74) *Attorney, Agent, or Firm* — Maschoff Brennan

(57) ABSTRACT

A method for recognizing a Chinese-English mixed speech, includes: determining pronunciation information and scores of a language model, of speech information, in response to receiving the speech information; determining whether an English word exists in content of the speech information based on the pronunciation information; determining a Chinese word corresponding to the English word based on a preset Chinese-English mapping table in response to the English word existing in the content of the speech information, in which the Chinese-English mapping table includes a mapping relationship of at least one pair of English word and Chinese word; determining a score of the Chinese word corresponding to the English word; replacing a score of the English word in the scores of the language model with the score of the Chinese word; and obtaining a speech recognition result for the speech information based on the replaced scores of the language model.

20 Claims, 7 Drawing Sheets

(56) References Cited

U.S. PATENT DOCUMENTS

| | | | | |
|---|---|---|---|---|
| 11,151,984 | B2* | 10/2021 | Lichun | G10L 15/063 |
| 2017/0353406 | A1* | 12/2017 | Ramamurthy | G06F 3/04847 |
| 2020/0226327 | A1* | 7/2020 | Matusov | G06N 3/045 |

FOREIGN PATENT DOCUMENTS

| | | |
|---|---|---|
| CN | 105632485 | 6/2016 |
| CN | 106294460 A | 1/2017 |
| CN | 107910004 A | 4/2018 |
| CN | 108231066 A | 6/2018 |
| CN | 108932941 A | 12/2018 |
| CN | 110211588 A | 9/2019 |
| CN | 110428820 A | 11/2019 |
| CN | 110517668 A | 11/2019 |
| CN | 110634487 A | 12/2019 |
| CN | 110675854 A | 1/2020 |
| CN | 110895932 A | 3/2020 |
| JP | 2000222406 A | 8/2000 |

OTHER PUBLICATIONS

Chinese Office action dated Jun. 7, 2021 as received in application 202011399785.6.

Toshniwal et al. "Multilingual Speech Recognition With A Single End-To-End Model" TTI Chicago, Apr. 18, 2017.

Shan et al. "A Novel Large Vocabulary Continuous Speech Recognition Algorithm Combined with Language Recognition", ACTA Automatica Sinica. Mar. 2012.

* cited by examiner

METHOD FOR RECOGNIZING CHINESE-ENGLISH MIXED SPEECH, ELECTRONIC DEVICE, AND STORAGE MEDIUM

CROSS-REFERENCE TO RELATED APPLICATION

This application is based on and claims priority to Chinese Patent Application No. 202011399785.6 filed on Dec. 1, 2020, the content of which is hereby incorporated by reference in its entirety into this disclosure.

TECHNICAL FIELD

The disclosure relates to the field of computer technologies, particularly to the field of artificial intelligence (AI) such as speech technologies, natural language processing (NLP), deep learning (DL), and specifically to a method for recognizing a Chinese-English mixed speech, an electronic device, and a storage medium.

BACKGROUND

There may be Chinese-English mixed speaking in various speech recognition applications. For example, speaking content may be that "很高兴我们拿下了这个 deal; 这个事件的 behavior 对我们影响很大" (This a Chinese-English mixed speech, which means "I'm glad we won this deal; the behavior of this event has a great influence on us"). Furthermore, some homophones of Chinese pronunciations is similar to the word "deal" of English pronunciations, for example, Chinese pronunciations of 迪欧 (Chinese words, which means a name of an entity), and 第二 (Chinese words, which means the second) are similar to English pronunciations of the word "deal". In the related art, the Chinese-English mixed speech is directly recognized and checked based on a speech recognition model. However, due to some words with Chinese homophones, and a slight distinction of the language model on the homophones and the English word, a final speech recognition result may not be the English word as expected, and the recognition effect is poor.

SUMMARY

According to a first aspect of the disclosure, a method for recognizing a Chinese-English mixed speech is provided. The method includes: determining pronunciation information and scores of a language model, of speech information, in response to receiving the speech information; determining whether an English word exists in content of the speech information based on the pronunciation information; determining a Chinese word corresponding to the English word based on a preset Chinese-English mapping table in response to the English word existing in the content of the speech information, in which the Chinese-English mapping table includes a mapping relationship of at least one pair of English word and Chinese word; determining a score of the Chinese word corresponding to the English word; replacing a score of the English word in the scores of the language model with the score of the Chinese word; and obtaining a speech recognition result for the speech information based on the replaced scores of the language model.

According to a second aspect of the disclosure, an electronic device is provided. The electronic device includes: at least one processor; and a memory communicatively coupled to the at least one processor; in which, the memory is configured to store instructions executable by the at least one processor, and when the instructions are executed by the at least one processor, the at least one processor is caused to perform the method as described above.

According to a third aspect, a non-transitory computer-readable storage medium storing computer instructions is provided, in which the computer instructions are configured to enable a computer to perform the method as described above.

It should be understood that the content described in this section is not intended to identify the key or important features of the embodiments of the disclosure, nor is it intended to limit the scope of the disclosure. Additional features of the disclosure will be easily understood by the following description.

BRIEF DESCRIPTION OF THE DRAWINGS

The accompanying drawings are used to understand the solution better, and do not constitute a limitation on the application, in which.

DETAILED DESCRIPTION

The following describes the exemplary embodiments of the disclosure with reference to the accompanying drawings, which includes various details of the embodiments of the disclosure to facilitate understanding and shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

A method and an apparatus for recognizing a Chinese-English mixed speech, an electronic device, and a storage medium, provided in some embodiments of the disclosure, are described referring to the accompanying drawings.

Figure 1:
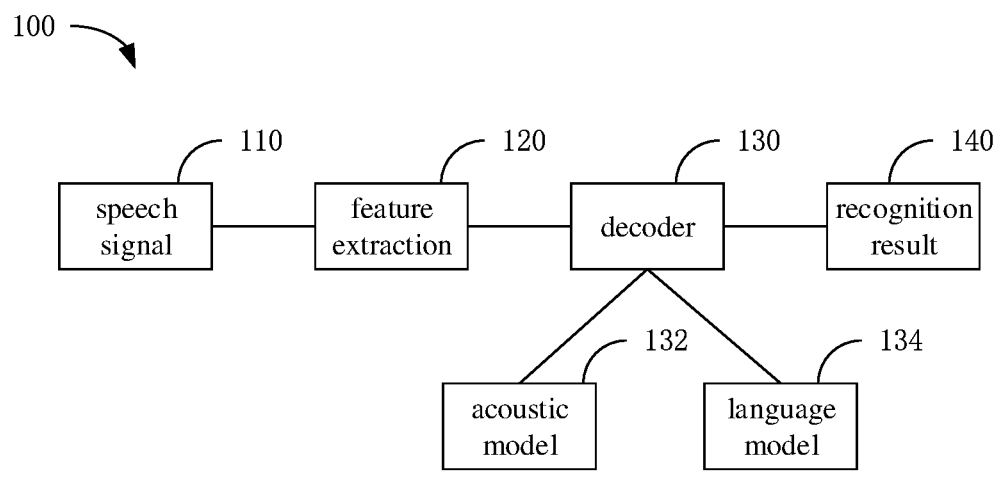
FIG. 1 is a schematic diagram illustrating a process 100 of performing speech recognition according to some embodiments of the disclosure.

FIG. 1 is a schematic diagram illustrating a process 100 of performing speech recognition according to some embodiments of the disclosure. A speech recognition system may generally include an acoustic model, a language model, a decoder, etc. As illustrated in FIG. 1, after a collected speech signal 110 is obtained, signal processing and feature extraction are performed on the speech signal 110 at block 120 first, including extracting features from the input speech signal 110, for processing by the subsequent acoustic model. Alternatively, the feature extraction process further includes some other signal processing technologies, so as to reduce the impact of environment noise or other factors on the features.

Referring to FIG. 1, after feature extraction 120 is completed, the features extracted are input to a decoder 130, and processed by the decoder 130 to output a text recognition result 140. In detail, the decoder 130 searches a text sequence of the speech signal output with the maximum probability based on an acoustic model 132 and a language model 134, in which the acoustic model 132 may achieve transformation from the speech to the pronunciation segment, and the language model 134 may achieve transformation from the pronunciation segment to the text.

The acoustic model 132 is configured for the joint modeling of acoustics and language on the pronunciation segment, and the modeling unit may be a syllable. In some embodiments, the acoustic model 132 may be a Streaming Multi-Layer Truncated Attention (SMLTA) model, in which the SMLTA model may utilize peak information of a Connectionist Temporal Classification (CTC) model to segment the speech into a plurality of small segments, so that modeling and decoding of the SMLTA model may be performed on each small segment. In this way, the SMLTA model may support real-time streaming speech recognition and achieve the higher recognition accuracy rate.

The language model 134 is configured to model the language. Generally, a statistical N-Gram may be adopted, that is, an occurrence probability of N words before and after may be counted. It should be understood that, any known language model or any language model developed in the future may be used in combination with embodiments of the disclosure. In some embodiments, the acoustic model 132 may be trained and/or work based on a speech database, and the language model 134 may be trained and/or work based on a text database.

The decoder 130 may achieve dynamic decoding based on recognition results of the acoustic model 132 and the language model 134. For example, possible recognition paths may be extended on the decoder, and the path with the highest feature score result is finally selected as the final recognition result. In a certain speech recognition scenario, the user is speaking to the user device, and the speech (and sound) generated by the user is collected by the user device, for example, the speech may be collected through a sound collection device (such as a microphone) of the user device. The user device may be any electronic device that may collect speech signals, including but being not limited to a smart mobile, a tablet computer, a desktop computer, a notebook computer, an intelligent wearable device (such as a smart watch, smart glasses), a navigation device, a multimedia playing device, an education device, a game device, a smart speaker, etc. During the collection process, the user device may send the speech to a server in segments via a network. The server includes a speech recognition model, which may achieve real-time and accurate speech recognition, and send the recognition result to the user device via the network after recognition. It should be understood that, the streaming speech recognition result display method based on the embodiments of the disclosure may be executed at the user device, and also may be executed at the server, or a part may be executed at the user device and the other may be executed at the server.

Figure 2:
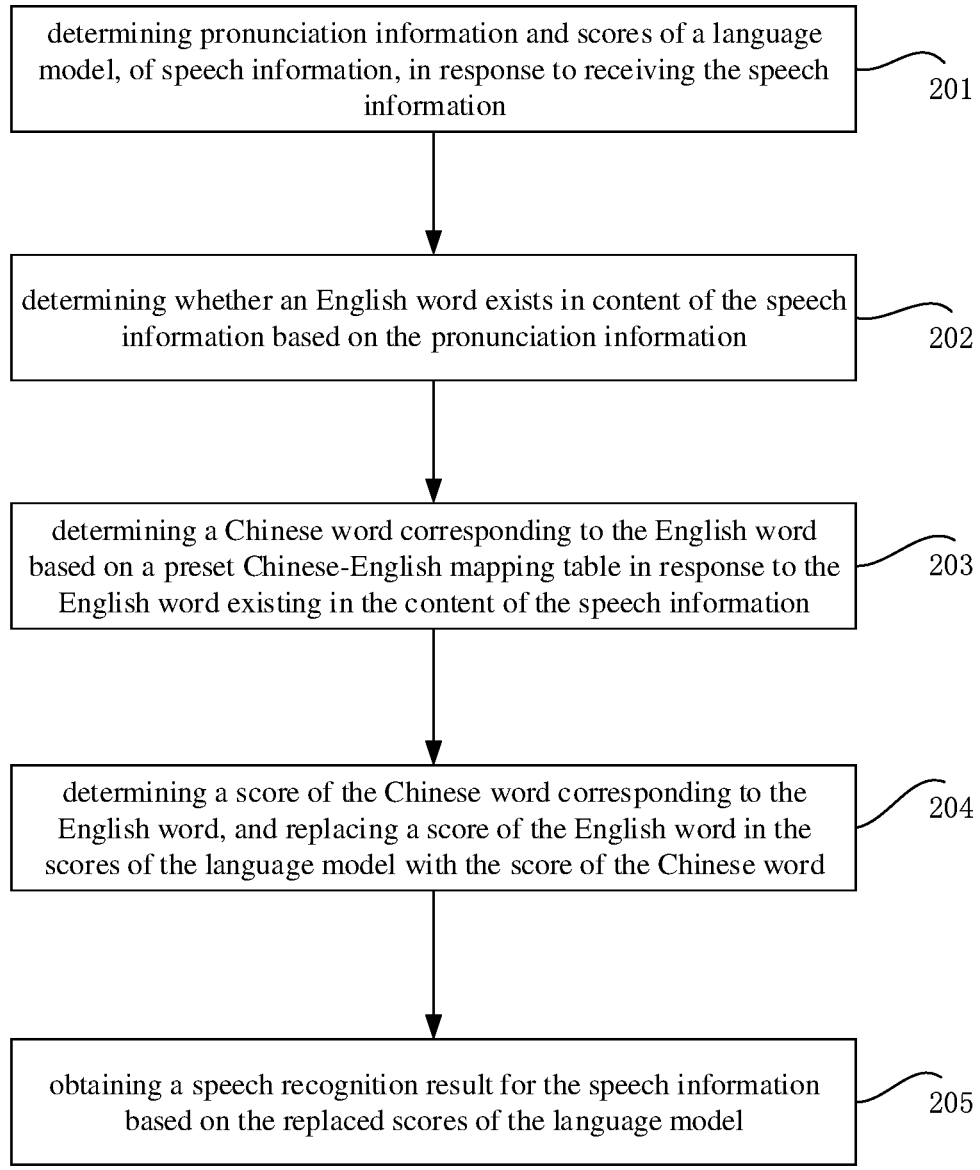
FIG. 2 is a flowchart illustrating a method for recognizing a Chinese-English mixed speech in some embodiments of the disclosure.

FIG. 2 is a flowchart illustrating a method for recognizing a Chinese-English mixed speech in some embodiments of the disclosure. It should be noted that, the method for recognizing the Chinese-English mixed speech in some embodiments of the disclosure is applied to an apparatus for recognizing a Chinese-English mixed speech in some embodiments of the disclosure. The apparatus for recognizing the Chinese-English mixed speech is configured in an electronic device. As illustrated in FIG. 2, the method may include the following.

At block 201, pronunciation information and scores of a language model, of speech information, are determined in response to receiving the speech information.

In some embodiments of the disclosure, electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. As an example, the electronic device may be the user device.

In a certain speech recognition scenario, the user is speaking to the user device, and the speech (and sound) generated by the user is collected by the user device, for example, the speech may be collected through a sound collection device (such as a microphone) of the user device. When the speech information collected by the user device is received, the pronunciation information and the scores of the language model of the speech information are determined in response to receiving the speech information.

In some embodiments, the pronunciation information of the speech information may be determined through a pre-established acoustic model. For example, the speech information may be input to the acoustic model and the pronunciation information output by the acoustic model may be obtained. In some embodiments, the pronunciation information may include: the pitch of the corresponding speech frame, the content of the target phoneme corresponding to the corresponding speech frame, the content of adjacent phonemes of the target phoneme, and the liaison indicator.

In some embodiments, the scores of the language model of the speech information may be determined through the language model. The language model may be an N-Gram model.

At block 202, it is determined whether an English word exists in content of the speech information based on the pronunciation information.

As an example, in some embodiments of the disclosure, when the pronunciation information of the speech information is recognized by the acoustic model and the corresponding word is output based on the pronunciation information, it is recognized whether the English word exists in the content of the speech information.

In some embodiments, since the content of the English word is a string of letters beginning with a letter, it may be determined whether the word beginning with the letter exists in the content of the speech information based on the pronunciation information. If yes, it may be determined that the English word exists in the content of the speech information. If no, it may be determined that the English word does not exist in the content of the speech information.

At block 203, a Chinese word corresponding to the English word is determined based on a preset Chinese-English mapping table in response to the English word existing in the content of the speech information.

In some embodiments, the Chinese-English mapping table includes a mapping relationship of at least one pair of English word and Chinese word. For example, there are a mapping relationship between the English word "deal" and the Chinese word "合同", and a mapping relationship between the English word "behavior" and the Chinese word "行为".

In some embodiments, when the English word exists in the content of the speech information, the Chinese word corresponding to the English word in the content of the speech information may be determined based on the mapping relationship between the English word and the Chinese word in the Chinese-English mapping table. For example, taking speech content "很高兴我们拿下了这个 deal; 这个事件的 behavior 对我们影响很大" (This a Chinese-English mixed speech, which means "I'm glad we won this deal; the behavior of this event has a great influence on us") for an example, it may be determined that English words "deal" and "behavior" exist in the speech content. It may be determined that the English word "deal" in the speech content corresponds to the Chinese word "合同", and the English word "behavior" in the speech content corresponds to the Chinese word "行为" based on the mapping relationships between the English words and the Chinese words in the Chinese-English mapping table.

At block 204, a score of the Chinese word corresponding to the English word is determined, and a score of the English word in the scores of the language model is replaced with the score of the Chinese word.

In some embodiments, the score of the Chinese word corresponding to the English word may be obtained from a pre-established language model score corpus. That is, the language model score corpus has a plurality of Chinese words and corresponding scores of the Chinese words. In this block, when the Chinese word corresponding to the English word in the content of the speech information is determined based on the mapping relationship between the English word and the Chinese word in the Chinese-English mapping table, the score of the Chinese word is obtained from the language model score corpus, and the score of the English word in the scores of the language model is replaced with the score of the Chinese word.

That is, when the English word exists in the content of the speech information, the score of the Chinese word corresponding to the English word may be obtained, and the score of the English word in the scores of the language model of the speech information may be replaced with the score of the Chinese word. In other words, the scores of the language model may be searched by the Chinese word corresponding to the English word to improve the score of the path located by the English word, and further to ensure that text of the English word may be output by the model as the speech recognition result corresponding to the English content in the speech information.

It should be noted that, in some embodiments of the disclosure, the score of the English word in the scores of the language model is replaced with the score of the Chinese word, which could be understood that, the score of the English word in the scores of the language model is replaced with the score of the Chinese word, and the text word corresponding to the English word is not replaced.

At block 205, a speech recognition result for the speech information is obtained based on the replaced scores of the language model.

Optionally, a decoding path with a maximum sum score of all nodes may be selected from the plurality of decoding paths of the composition space based on the replaced scores of the language model; and a word sequence corresponding to the decoding path with the maximum sum score of all nodes is determined as the speech recognition result for the speech information.

With the method for recognizing the Chinese-English mixed speech in some embodiments of the disclosure, the pronunciation information and the scores of the language model, of the speech information, are determined in response to receiving the speech information. It is determined whether the English word exists in the content of the speech information based on the pronunciation information. The Chinese word corresponding to the English word is determined based on the preset Chinese-English mapping table in response to the English word existing in the content of the speech information. The score of the Chinese word corresponding to the English word is determined, and the score of the English word in the scores of the language model is replaced with the score of the Chinese word. The speech recognition result for the speech information is obtained based on the replaced scores of the language model. Therefore, with some embodiments of the disclosure, when the corresponding word is output based on the pronunciation information recognized through the acoustic model from the speech information, the score of the Chinese word corresponding to the English word in the speech content is adopted to search the scores of the language model based on the mapping relationship between the English word and the Chinese word in the Chinese-English mapping table, and the searched score of the Chinese word is replaced with the score of the English word in the scores of the language model, to improve the score of the path located by the English word, further to ensure that text of the English word may be output by the model as the speech recognition result corresponding to the English content in the speech information and enhance the entire recognition result of the Chinese-English mixed speech.

Figure 3:
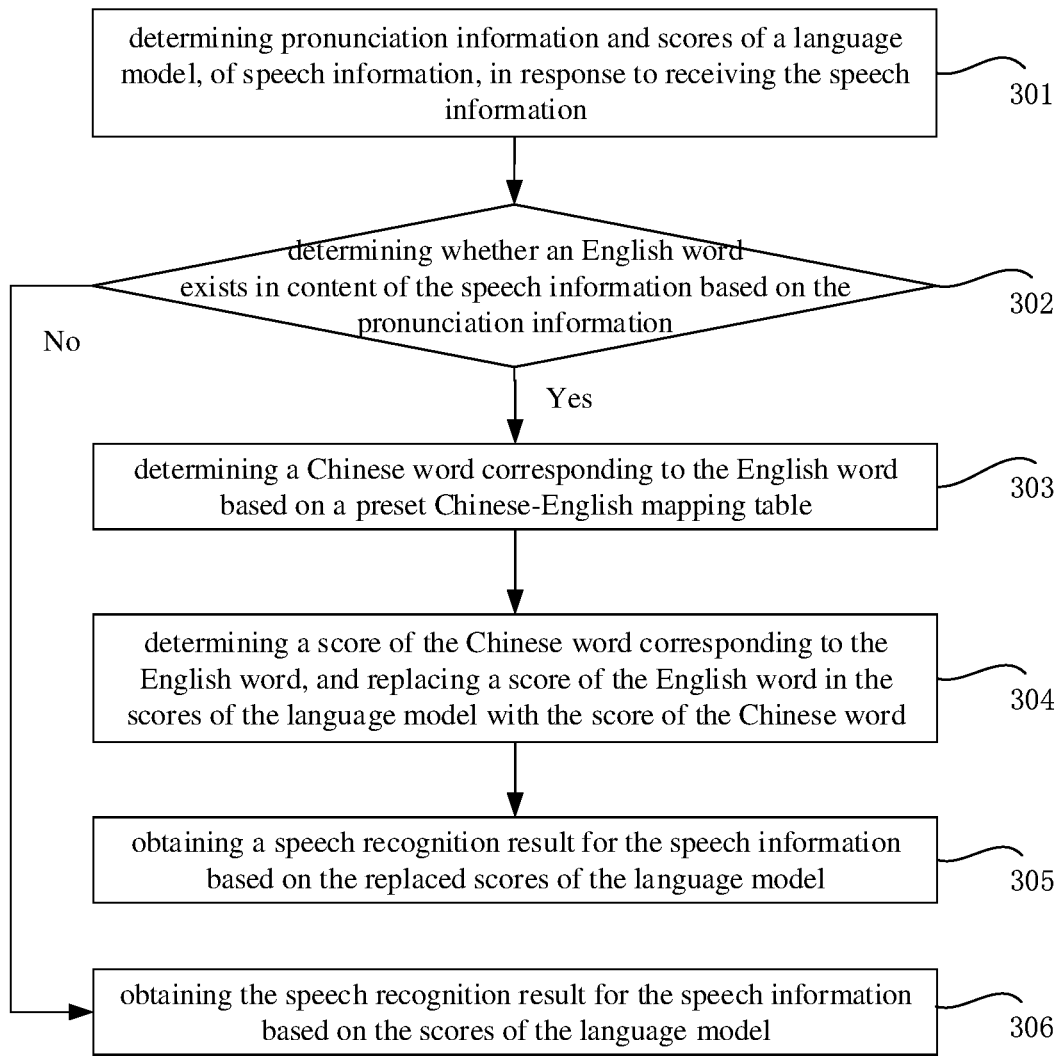
FIG. 3 is a flowchart illustrating a method for recognizing a Chinese-English mixed speech in some embodiments of the disclosure.

It should be noted that, when it is determined that the English word does not exist in the content of the speech information, the scores of the language model of the speech information may be directly configured to recognize the decoding result. In some embodiments, as illustrated in FIG. 3, the method may include the following.

At block 301, pronunciation information and scores of a language model, of speech information, are determined in response to receiving the speech information.

In some embodiments of the disclosure, the action at block 301 may be implemented in any one way of various embodiments of the disclosure, which is not limited herein and not repeated herein.

At block 302, it is determined whether an English word exists in content of the speech information based on the pronunciation information.

As an example, in some embodiments of the disclosure, when the pronunciation information of the speech information is recognized by the acoustic model and the corresponding word is output based on the pronunciation information, it is recognized whether the English word exists in the content of the speech information.

In some embodiments, since the content of the English word is a string of letters beginning with a letter, it may be determined whether the word beginning with the letter exists in the content of the speech information based on the pronunciation information. If yes, it may be determined that the English word exists in the content of the speech information, and the action at block 303 may be executed. If no, it may be determined that the English word does not exist in the content of the speech information, and the action at block 306 may be executed.

At block 303, a Chinese word corresponding to the English word is determined based on a preset Chinese-English mapping table in response to the English word existing in the content of the speech information.

In some embodiments of the disclosure, the action at block 303 may be implemented in any one way of various embodiments of the disclosure, which is not limited herein and not repeated herein.

At block 304, a score of the Chinese word corresponding to the English word is determined, and a score of the English word in the scores of the language model is replaced with the score of the Chinese word.

In some embodiments of the disclosure, the action at block 304 may be implemented in any one way of various embodiments of the disclosure, which is not limited herein and not repeated herein.

At block 305, a speech recognition result for the speech information is obtained based on the replaced scores of the language model.

In some embodiments of the disclosure, the action at block 305 may be implemented in any one way of various embodiments of the disclosure, which is not limited herein and not repeated herein.

At block 306, the speech recognition result for the speech information is obtained based on the scores of the language model in response to the English word not existing in the content of the speech information.

Optionally, when it is determined that the English word does not exist in the content of the speech information, a path with the highest feature score result is selected from decoding paths based on the scores of the language model of the speech information, and a word sequence corresponding to nodes in the path with the highest feature score result is taken as the speech recognition result of the speech information.

With the method for recognizing the Chinese-English mixed speech in some embodiments of the disclosure, it is determined whether the English word exists in the content of the speech information based on the pronunciation information of the speech information. The Chinese word corresponding to the English word is determined based on the preset Chinese-English mapping table in response to the English word existing in the content of the speech information. The score of the Chinese word corresponding to the English word is determined, and the score of the English word in the scores of the language model is replaced with the score of the Chinese word. The speech recognition result for the speech information is obtained based on the replaced scores of the language model. The speech recognition result for the speech information is obtained based on the scores of the language model in response to the English word not existing in the content of the speech information. Thus, the disclosure may be applied to a Chinese-English mixed speech recognition scenario and a non-mixed speech recognition scenario. For example, under the case that the current scenario recognized is the non-mixed speech recognition scenario, the speech recognition result for the speech information may be obtained directly based on the scores of the language model of the speech information. Under the case that the current scenario recognized is the Chinese-English mixed speech recognition scenario, when the corresponding word is output based on the pronunciation information recognized through the acoustic model from the speech information, the score of the Chinese word corresponding to the English word in the speech content is adopted to search the scores of the language model based on the mapping relationship between the English word and the Chinese word in the Chinese-English mapping table, and the searched score of the Chinese word is replaced with the score of the English word in the scores of the language model, to improve the score of the path located by the English word, further to ensure that text of the English word may be output by the model as the speech recognition result corresponding to the English content in the speech information and enhance the entire recognition result of the Chinese-English mixed speech.

Figure 4:
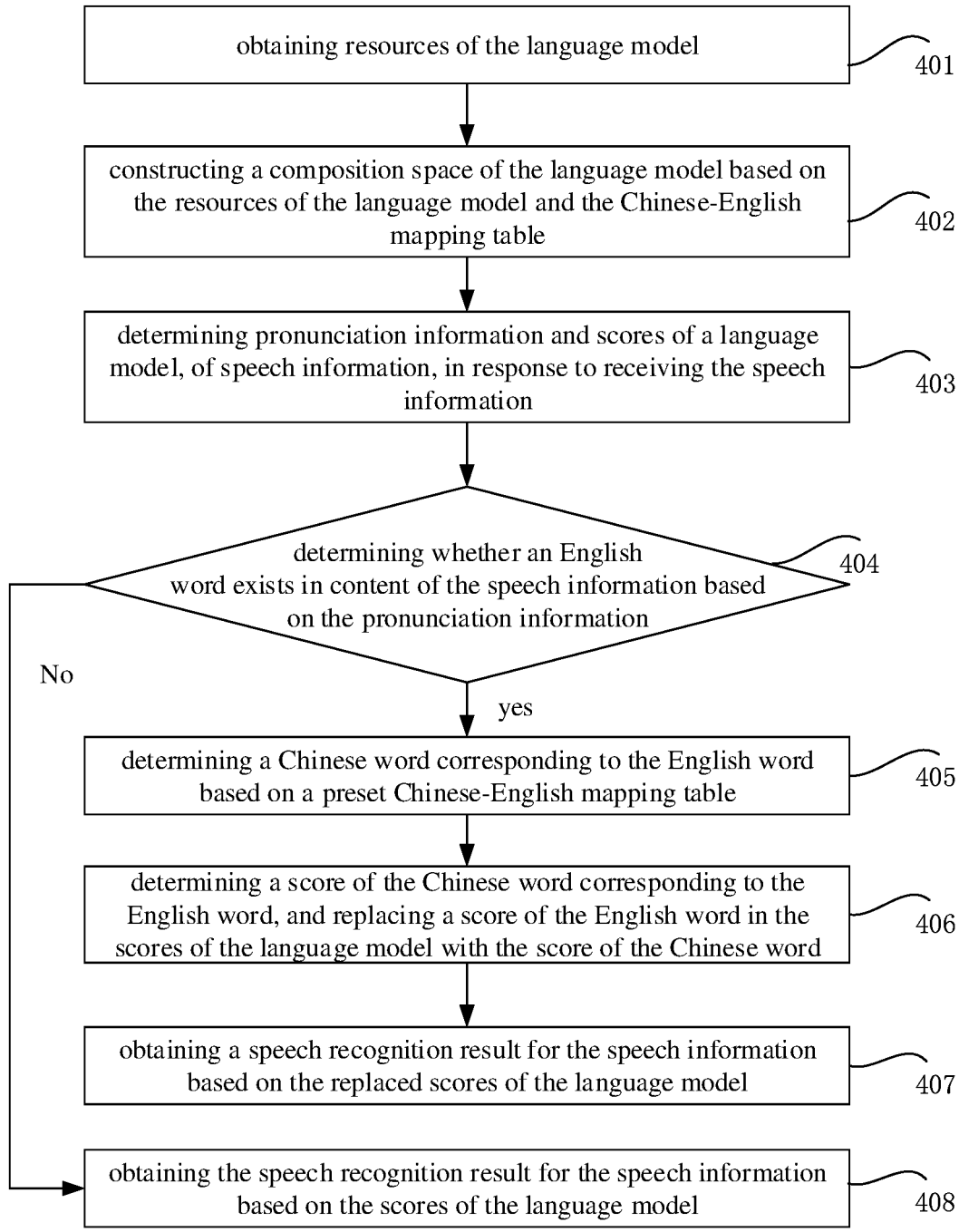
FIG. 4 is a flowchart illustrating a method for recognizing a Chinese-English mixed speech in some embodiments of the disclosure.

In some embodiments, the method for recognizing the Chinese-English mixed speech may be applied to a local speech recognition scenario on the terminal device. In order to further improve the entire recognition effect of the Chinese-English mixed speech, before a local speech is recognized, a composition space of the language model needs to be constructed for a pre-recognized text, that is, all possible paths for the speech input by the user are constructed. When the speech is recognized, the composition space may be traversed, and a path best matching the input speech is searched in combination with a speech recognition algorithm in the embodiments, which may return to the final result recognized. In some embodiments, as illustrated in FIG. 4, the method may include the following.

At block 401, resources of the language model are obtained.

In some embodiments, the composition space of the language model may be constructed for the pre-recognized text before recognizing. When the composition space is constructed, the resources of the language model need to be obtained first. For example, the resources of the language model may be stored on a terminal device, and when the composition space is constructed, the resources of the language model may be read from the terminal device.

At block 402, a composition space of the language model is constructed based on the resources of the language model and the Chinese-English mapping table, in which the composition space comprises a plurality of decoding paths.

Optionally, an initial composition space of the language model is constructed based on the resources of the language model. The score of the language model of the Chinese word is configured to replace the score of the path containing the English word in the initial composition space based on the mapping relationship between the English word and the Chinese word in the Chinese-English mapping table. The replaced initial composition space is taken as the composition space of the language model.

Figure 5:
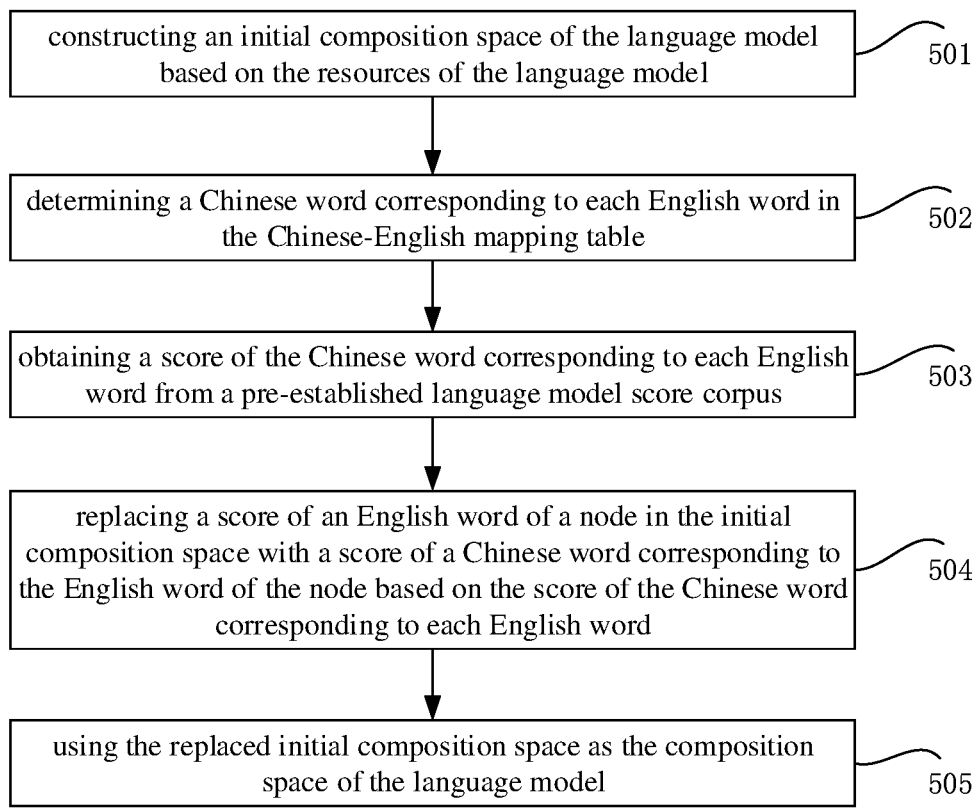
FIG. 5 is a flowchart illustrating constructing a composition space of a language model according to some embodiments of the disclosure.

In some embodiments, as illustrated in FIG. 5, the specific implementation process of constructing the composition space of the language model based on the resources of the language model and the Chinese-English mapping table may include the following.

At block 501, an initial composition space of the language model is constructed based on the resources of the language model.

In some embodiments, the initial composition space may include a plurality of decoding paths. The node in each decoding path has the corresponding word and the score of the word. At least one decoding path in the plurality of decoding paths has the score of an English word.

At block 502, a Chinese word corresponding to each English word in the Chinese-English mapping table is determined.

At block 503, a score of the Chinese word corresponding to each English word is obtained from a pre-established language model score corpus.

At block 504, a score of an English word of a node in the initial composition space is replaced with a score of a Chinese word corresponding to the English word of the node based on the score of the Chinese word corresponding to each English word.

At block 505, the replaced initial composition space is used as the composition space of the language model.

Thus, the composition space of the language model may be constructed through blocks 501 to 505 to establish all possible paths for the speech input by the user, so that when the speech is recognized, the path best matching the input speech may be searched by traversing the composition space, which may return to the final recognized result.

At block 403, pronunciation information and scores of a language model, of speech information, are determined in response to receiving the speech information.

In some embodiments of the disclosure, the action at block 403 may be implemented in any one way of various embodiments of the disclosure, which is not limited herein and not repeated herein.

At block 404, it is determined whether an English word exists in content of the speech information based on the pronunciation information.

In some embodiments of the disclosure, the action at block 404 may be implemented in any one way of various embodiments of the disclosure, which is not limited herein and not repeated herein.

At block 405, a Chinese word corresponding to the English word is determined based on a preset Chinese-English mapping table in response to the English word existing in the content of the speech information.

In some embodiments of the disclosure, the action at block 405 may be implemented in any one way of various embodiments of the disclosure, which is not limited herein and not repeated herein.

At block 406, a score of the Chinese word corresponding to the English word is determined, and a score of the English word in the scores of the language model is replaced with the score of the Chinese word.

In some embodiments of the disclosure, the action at block 406 may be implemented in any one way of various embodiments of the disclosure, which is not limited herein and not repeated herein.

At block 407, a speech recognition result for the speech information is obtained based on the replaced scores of the language model.

In some embodiments, a decoding path with a maximum sum score of all nodes is selected from the plurality of decoding paths of the composition space based on the replaced scores of the language model, and a word sequence corresponding to the decoding path with the maximum sum score of all nodes may be determined as the speech recognition result for the speech information.

At block 408, the speech recognition result for the speech information is obtained based on the scores of the language model in response to the English word not existing in the content of the speech information.

Optionally, when it is determined that the English word does not exist in the content of the speech information, a decoding path with a maximum sum score of all nodes is selected from the plurality of decoding paths of the composition space based on the scores of the language model, and a word sequence corresponding to the decoding path with the maximum sum score of all nodes may be determined as the speech recognition result for the speech information.

With the method for recognizing the Chinese-English mixed speech in some embodiments of the disclosure, before a local speech is recognized, a composition space of the language model needs to be constructed for a pre-recognized text, that is, all possible paths for the speech input by the user are constructed. When the speech is recognized, the composition space may be traversed, and a path best matching the input speech is searched in combination with a speech recognition algorithm in the embodiments, which may return to the final result recognized. Therefore, the entire recognition effect of the Chinese-English mixed speech may be enhanced.

Figure 6:
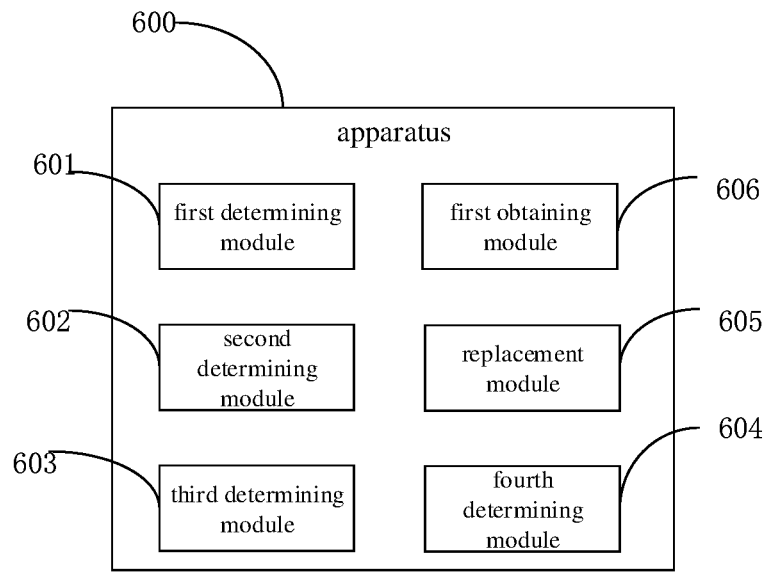
FIG. 6 is a block diagram illustrating an apparatus for recognizing a Chinese-English mixed speech in some embodiments of the disclosure.

FIG. 6 is a block diagram illustrating an apparatus for recognizing a Chinese-English mixed speech in some embodiments of the disclosure. As illustrated in FIG. 6, the apparatus 600 may include a first determining module 601, a second determining module 602, a third determining module 603, a fourth determining module 604, a replacement module 605, and a first obtaining module 606.

The first determining module 601 is configured to determine pronunciation information and scores of a language model, of speech information, in response to receiving the speech information.

The second determining module 602 is configured to determine whether an English word exists in content of the speech information based on the pronunciation information.

The third determining module 603 is configured to determine a Chinese word corresponding to the English word based on a preset Chinese-English mapping table in response to the English word existing in the content of the speech information, in which the Chinese-English mapping table includes a mapping relationship of at least one pair of English word and Chinese word.

The fourth determining module 604 is configured to determine a score of the Chinese word corresponding to the English word.

The replacement module 605 is configured to replace a score of the English word in the scores of the language model with the score of the Chinese word.

The first obtaining module 606 is configured to obtain a speech recognition result for the speech information based on the replaced scores of the language model.

In some embodiments, the first obtaining module 606 is further configured to, obtain the speech recognition result for the speech information based on the scores of the language model in response to the English word not existing in the content of the speech information.

Figure 7:
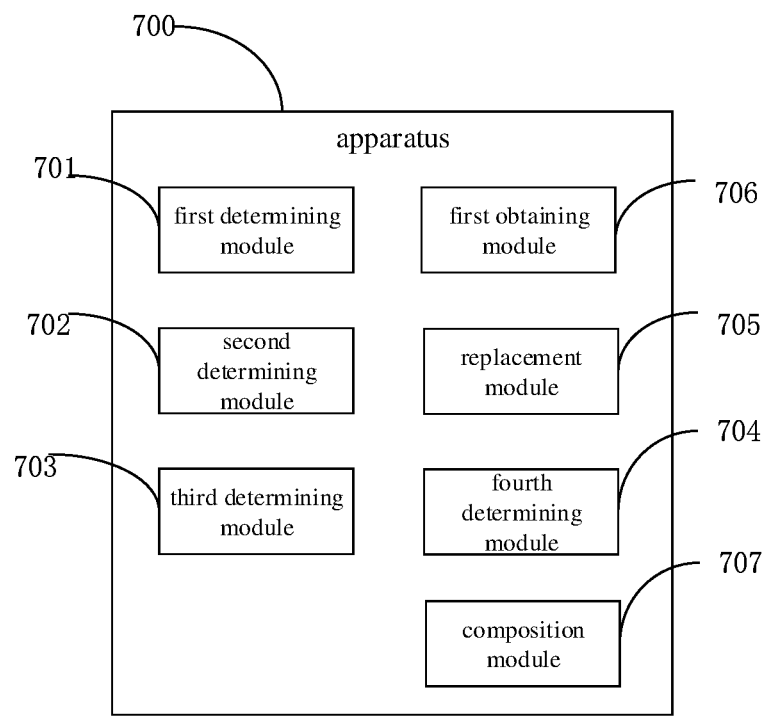
FIG. 7 is a block diagram illustrating an apparatus for recognizing a Chinese-English mixed speech in some embodiments of the disclosure.

In some embodiments, as illustrated in FIG. 7, the apparatus 700 may further include a composition module 707.

The composition module 707 is configured to, before determining the pronunciation information and the scores of the language model of the speech information by the first determining module, obtain resources of the language model; and construct a composition space of the language model based on the resources of the language model and the Chinese-English mapping table, in which the composition space comprises a plurality of decoding paths.

In some embodiments, the composition module 707 is specifically configured to: construct an initial composition space of the language model based on the resources of the language model; determine a Chinese word corresponding to each English word in the Chinese-English mapping table; obtain a score of the Chinese word corresponding to each English word from a pre-established language model score corpus; replace a score of an English word of a node in the initial composition space with a score of a Chinese word corresponding to the English word of the node based on the score of the Chinese word corresponding to each English word; and use the replaced initial composition space as the composition space of the language model.

In some embodiments, the specific implementation process of obtaining the speech recognition result for the speech information according to the replaced scores of the language model by the first obtaining module 606 may be as follow. A decoding path with a maximum sum score of all nodes may be selected from the plurality of decoding paths of the composition space based on the replaced scores of the language model; and a word sequence corresponding to the decoding path with the maximum sum score of all nodes may be determined as the speech recognition result for the speech information.

Modules 701 to 706 in FIG. 7 have the same function and structure with modules 601 to 606 in FIG. 6.

With regard to the apparatus in the above embodiments, the specific way in which each module performs the operation has been described in detail in the embodiments of the method and will not be elaborated herein.

With the apparatus for recognizing the Chinese-English mixed speech in some embodiments of the disclosure, when the corresponding word is output based on the pronunciation information recognized through the acoustic model from the speech information, the score of the Chinese word corresponding to the English word in the speech content is adopted to search the scores of the language model based on the mapping relationship between the English word and the Chinese word in the Chinese-English mapping table, and the searched score of the Chinese word is replaced with the score of the English word in the scores of the language model, to improve the score of the path located by the English word, further to ensure that text of the English word may be output by the model as the speech recognition result corresponding to the English content in the speech information and enhance the entire recognition result of the Chinese-English mixed speech.

An electronic device and a readable storage medium are further provided according to some embodiments of the disclosure.

Figure 8:
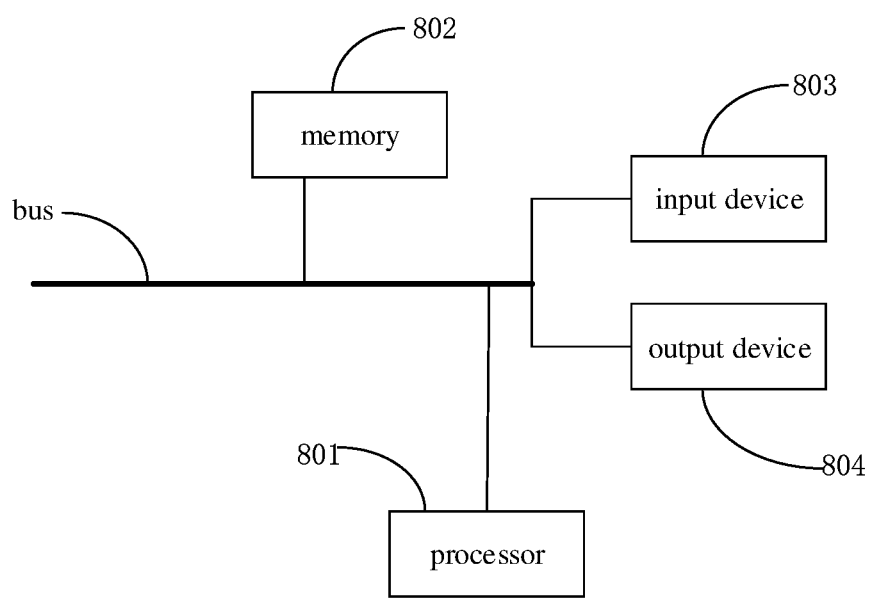
FIG. 8 is a block diagram illustrating an electronic device for implement a method for recognizing a Chinese-English mixed speech in some embodiments of the disclosure.

FIG. 8 is a block diagram illustrating an electronic device for implement a method for recognizing a Chinese-English mixed speech in some embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 8, the electronic device includes: one or more processors 801, a memory 802, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 801 is taken as an example in FIG. 8.

The memory 802 is a non-transitory computer-readable storage medium according to the disclosure. The memory stores instructions executable by at least one processor, so that the at least one processor executes the method according to the disclosure. The non-transitory computer-readable storage medium of the disclosure stores computer instructions, which are used to cause a computer to execute the method according to the disclosure.

As a non-transitory computer-readable storage medium, the memory 802 is configured to store non-transitory software programs, non-transitory computer executable programs and modules, such as program instructions/modules corresponding to the method in the embodiment of the disclosure (for example, a first determining module 601, a second determining module 602, a third determining module 603, a fourth determining module 604, a replacement module 605, and a first obtaining module 606 in FIG. 6). The processor 801 executes various functional applications and data processing of the server by running non-transitory software programs, instructions, and modules stored in the memory 802, that is, implementing the method in the foregoing method embodiments.

The memory 802 may include a storage program area and a storage data area, where the storage program area may store an operating system and application programs required for at least one function. The storage data area may store data created according to the use of the electronic device for implementing the method. In addition, the memory 802 may include a high-speed random access memory, and a non-transitory memory, such as at least one magnetic disk storage device, a flash memory device, or other non-transitory solid-state storage device. In some embodiments, the memory 802 may optionally include a memory remotely disposed with respect to the processor 801, and these remote memories may be connected to the electronic device for implementing the method through a network. Examples of the above network include, but are not limited to, the Internet, an intranet, a local area network, a mobile communication network, and combinations thereof.

The electronic device for implementing the method may further include: an input device 803 and an output device 804. The processor 801, the memory 802, the input device 803, and the output device 804 may be connected through a bus or in other manners. In FIG. 8, the connection through the bus is taken as an example.

The input device 803 may receive inputted numeric or character information, and generate key signal inputs related to user settings and function control of an electronic device for implementing the method, such as a touch screen, a keypad, a mouse, a trackpad, a touchpad, an indication rod, one or more mouse buttons, trackballs, joysticks and other input devices. The output device 804 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, sound input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

It should be understood that various forms of processes shown above may be used to reorder, add, or delete steps. For example, the steps described in the disclosure may be performed in parallel, sequentially, or in different orders. As long as the desired results of the technical solutions disclosed in the disclosure can be achieved, no limitation is made herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A method for recognizing a Chinese-English mixed speech, comprising:
   determining pronunciation information and scores of a language model, of speech information, in response to receiving the speech information;
   determining whether an English word exists in content of the speech information based on the pronunciation information;
   determining a Chinese word corresponding to the English word based on a preset Chinese-English mapping table in response to the English word existing in the content of the speech information, in which the Chinese-English mapping table comprises a mapping relationship of at least one pair of English word and Chinese word;
   determining a score of the Chinese word corresponding to the English word;
   replacing a score of the English word in the scores of the language model with the score of the Chinese word; and
   obtaining a speech recognition result for the speech information based on the replaced scores of the language model.

2. The method of claim 1, further comprising:
   obtaining the speech recognition result for the speech information based on the scores of the language model in response to the English word not existing in the content of the speech information.

3. The method of claim 1, further comprising:
   obtaining resources of the language model; and
   constructing a composition space of the language model based on the resources of the language model and the Chinese-English mapping table, in which the composition space comprises a plurality of decoding paths.

4. The method of claim 3, wherein, constructing the composition space of the language model based on the resources of the language model and the Chinese-English mapping table, comprises:
   constructing an initial composition space of the language model based on the resources of the language model;
   determining a Chinese word corresponding to each English word in the Chinese-English mapping table;
   obtaining a score of the Chinese word corresponding to each English word from a pre-established language model score corpus;
   replacing a score of an English word of a node in the initial composition space with a score of a Chinese word corresponding to the English word of the node based on the score of the Chinese word corresponding to each English word; and
   using the replaced initial composition space as the composition space of the language model.

5. The method of claim 3, wherein, obtaining the speech recognition result for the speech information based on the replaced scores of the language model, comprises:
- selecting a decoding path with a maximum sum score of all nodes from the plurality of decoding paths of the composition space based on the replaced scores of the language model; and
- determining a word sequence corresponding to the decoding path with the maximum sum score of all nodes as the speech recognition result for the speech information.

6. The method of claim 1, wherein the pronunciation information of the speech information is determined through a pre-established acoustic model and the scores of the language model of the speech information is determined through the language model, in which the language model is an N-Gram model.

7. The method of claim 1, wherein determining whether the English word exists in the content of the speech information based on the pronunciation information comprises:
- when the pronunciation information of the speech information is recognized by an acoustic model, a corresponding word is output based on the pronunciation information; and
- determined whether the corresponding word beginning with a letter exists in the content of the speech information based on the pronunciation information.

8. An electronic device, comprising:
- at least one processor; and
- a memory communicatively coupled to the at least one processor; wherein,
- the memory is configured to store instructions executable by the at least one processor, and when the instructions are executed by the at least one processor, the at least one processor is caused to perform:
- determining pronunciation information and scores of a language model, of speech information, in response to receiving the speech information;
- determining whether an English word exists in content of the speech information based on the pronunciation information;
- determining a Chinese word corresponding to the English word based on a preset Chinese-English mapping table in response to the English word existing in the content of the speech information, in which the Chinese-English mapping table comprises a mapping relationship of at least one pair of English word and Chinese word;
- determining a score of the Chinese word corresponding to the English word;
- replacing a score of the English word in the scores of the language model with the score of the Chinese word; and
- obtaining a speech recognition result for the speech information based on the replaced scores of the language model.

9. The device of claim 8, wherein when the instructions are executed by the at least one processor, the at least one processor is caused to further perform:
- obtaining the speech recognition result for the speech information based on the scores of the language model in response to the English word not existing in the content of the speech information.

10. The device of claim 8, wherein when the instructions are executed by the at least one processor, the at least one processor is caused to further perform:
- obtaining resources of the language model; and
- constructing a composition space of the language model based on the resources of the language model and the Chinese-English mapping table, in which the composition space comprises a plurality of decoding paths.

11. The device of claim 10, wherein, constructing the composition space of the language model based on the resources of the language model and the Chinese-English mapping table, comprises:
- constructing an initial composition space of the language model based on the resources of the language model;
- determining a Chinese word corresponding to each English word in the Chinese-English mapping table;
- obtaining a score of the Chinese word corresponding to each English word from a pre-established language model score corpus;
- replacing a score of an English word of a node in the initial composition space with a score of a Chinese word corresponding to the English word of the node based on the score of the Chinese word corresponding to each English word; and
- using the replaced initial composition space as the composition space of the language model.

12. The device of claim 10, wherein, obtaining the speech recognition result for the speech information based on the replaced scores of the language model, comprises:
- selecting a decoding path with a maximum sum score of all nodes from the plurality of decoding paths of the composition space based on the replaced scores of the language model; and
- determining a word sequence corresponding to the decoding path with the maximum sum score of all nodes as the speech recognition result for the speech information.

13. The device of claim 8, wherein the pronunciation information of the speech information is determined through a pre-established acoustic model and the scores of the language model of the speech information is determined through the language model, in which the language model is an N-Gram model.

14. The device of claim 8, wherein determining whether the English word exists in the content of the speech information based on the pronunciation information comprises:
- when the pronunciation information of the speech information is recognized by an acoustic model, a corresponding word is output based on the pronunciation information; and
- determined whether the corresponding word beginning with a letter exists in the content of the speech information based on the pronunciation information.

15. A non-transitory computer-readable storage medium storing computer instructions, wherein the computer instructions are configured to enable a computer to perform:
- determining pronunciation information and scores of a language model, of speech information, in response to receiving the speech information;
- determining whether an English word exists in content of the speech information based on the pronunciation information;
- determining a Chinese word corresponding to the English word based on a preset Chinese-English mapping table in response to the English word existing in the content of the speech information, in which the Chinese-English mapping table comprises a mapping relationship of at least one pair of English word and Chinese word;
- determining a score of the Chinese word corresponding to the English word;

replacing a score of the English word in the scores of the language model with the score of the Chinese word; and obtaining a speech recognition result for the speech information based on the replaced scores of the language model.

16. The non-transitory computer-readable storage medium of claim 15, wherein the computer instructions are configured to enable a computer to further perform:

obtaining the speech recognition result for the speech information based on the scores of the language model in response to the English word not existing in the content of the speech information.

17. The non-transitory computer-readable storage medium of claim 15, wherein the computer instructions are configured to enable a computer to further perform:

obtaining resources of the language model; and constructing a composition space of the language model based on the resources of the language model and the Chinese-English mapping table, in which the composition space comprises a plurality of decoding paths.

18. The non-transitory computer-readable storage medium of claim 17, wherein, constructing the composition space of the language model based on the resources of the language model and the Chinese-English mapping table, comprises:

constructing an initial composition space of the language model based on the resources of the language model;

determining a Chinese word corresponding to each English word in the Chinese-English mapping table;

obtaining a score of the Chinese word corresponding to each English word from a pre-established language model score corpus;

replacing a score of an English word of a node in the initial composition space with a score of a Chinese word corresponding to the English word of the node based on the score of the Chinese word corresponding to each English word; and using the replaced initial composition space as the composition space of the language model.

19. The non-transitory computer-readable storage medium of claim 17, wherein, obtaining the speech recognition result for the speech information based on the replaced scores of the language model, comprises:

selecting a decoding path with a maximum sum score of all nodes from the plurality of decoding paths of the composition space based on the replaced scores of the language model; and determining a word sequence corresponding to the decoding path with the maximum sum score of all nodes as the speech recognition result for the speech information.

20. The non-transitory computer-readable storage medium of claim 15, wherein the pronunciation information of the speech information is determined through a pre-established acoustic model and the scores of the language model of the speech information is determined through the language model, in which the language model is an N-Gram model.

* * * * *